United States Patent [19]

Stein et al.

[11] 4,417,822
[45] Nov. 29, 1983

[54] LASER RADIOMETER

[75] Inventors: Alexander Stein, Secaucus, N.J.; Paul Rabinowitz, Old Bethpage, N.Y.; Andrew Kaldor, Watchung, N.J.

[73] Assignee: Exxon Research and Engineering Company, Florham, N.J.

[21] Appl. No.: 319,244

[22] Filed: Nov. 9, 1981

Related U.S. Application Data

[63] Continuation-in-part of Ser. No. 229,172, Jan. 28, 1981, abandoned.

[51] Int. Cl.³ .................. G01J 5/52; G01J 5/62
[52] U.S. Cl. ........................ 374/129; 356/43; 356/45; 356/349; 374/126; 374/130
[58] Field of Search ............... 374/129, 126, 130; 356/43, 48, 45; 250/338

[56] References Cited

U.S. PATENT DOCUMENTS

| | | | |
|---|---|---|---|
| 2,702,494 | 2/1955 | Lieneweg et al. | 356/45 |
| 3,264,931 | 8/1966 | Ackerman et al. | 356/48 |
| 3,462,224 | 8/1969 | Woods et al. | 356/47 |
| 3,482,448 | 12/1969 | Gaffard | 356/43 X |
| 3,611,806 | 10/1971 | Hishikari | 374/129 |
| 3,822,098 | 7/1974 | Rudder et al. | 250/347 |
| 4,081,215 | 3/1978 | Penny et al. | 356/45 |
| 4,225,230 | 9/1980 | Dostoomion et al. | 356/45 |
| 4,305,640 | 12/1981 | Cullis et al. | 350/96.28 |

FOREIGN PATENT DOCUMENTS 2053650  4/1971  France ........................... 374/129

OTHER PUBLICATIONS

Publ., "Temperature Measurement by Optical Pyrometry with the Aid of Lazer Radiation", by Traverse et al., Ultra-Refractories Lab, (C.N.R.S.) (Translated, from French by The Language Center, Inc., C-4813, NJ, 19 pages).

Primary Examiner—Daniel M. Yasich
Attorney, Agent, or Firm—Ronald D. Hantman

[57] ABSTRACT

The present invention teaches a unique laser radiometer capable of accurately measuring the radiation temperature of a radiant surface and independently measuring the surface's emissivity. A narrow-band radiometer is combined with a laser reflectometer to measure concurrently radiance and emissivity of a remote, hot surface. Together, radiance and emissivity yield the true surface temperature of the remote target. A narrow receiver bandwidth is attained by one of two methods; (a) heterodyne detection or (b) optical filtering. A direct measurement of emissivity is used to adjust the value obtained for the thermal radiation signal to substantially enhance the accuracy of the temperature measurement for a given subject surface. The technique provides substantially high detection sensitivity over a very narrow spectral bandwidth.

16 Claims, 4 Drawing Figures

LASER RADIOMETER

This application is a continuation-in-part application of Ser. No. 229,172, filed Jan. 28, 1981 and now abandoned.

BACKGROUND OF THE INVENTION

The invention relates to temperature measurement radiometry and more particularly to a radiometer combined with a long range reflectometer for accurately measuring the temperature of a remote radiant source.

All bodies at temperatures above absolute zero emit radiation. At low temperatures the emission peaks in the infrared spectral region. For higher temperatures the emission shifts toward shorter wavelength, peaking in the visible spectrum for temperatures approaching that of the sun. Conventional radiometers used for temperature measurements intercept thermal radiation emitted from a radiant source; a calibrated thermopile or photodetector responds to the intercepted radiation, producing an electrical signal which is a measure of the temperature of the radiant source. Radiometric temperature measuring devices are reasonably accurate under idealized or specific conditions. The characteristics of thermal radiation emitted by a radiant source depend, however, not only upon the temperature of the source, but also on the emissivity of the sources' surface. Accurate temperature measurement by radiometric techniques necessitates either knowing or measuring the emissivity, which itself is a function of temperature and wavelength. The present invention accomplishes this necessity by directly measuring the subject surfaces' emissivity and adjusting or compensating the radiometric measurements to determine the objects real temperature. The application of optical radiometers to temperature measurement has also been limited to certain wavelength ranges by interfering media such as the flue gases of a fired furnace. This problem is typically minimized by narrowing the spectral width of detection to a spectral region where the medium interposed between target and radiometer exhibts minimal infrared absorption. This is conventionally achieved by spectral filtering. The shortcoming of such techniques is that the bandwidth of the conventional filter typically exceeds the spectral line spacing of the molecular gases by an order of magnitude with the result that there are usually molecular resonances within any chosen filter band.

The effective optical density of the gas interposed between radiometer and target depends on the number and strength of the molecular resonances within a given filter band width, and the number of molecules per cross-sectional area along the viewing path.

In cases where this effective optical density is too large to be ignored in the radiometer measurement, one can resort to heterodyne detection which yields an ultra narrow radiometer band width. The center frequency of this radiometer band can be tuned to avoid the molecular resonances of the interfering gas altogether.

The art has heretofore recognized several of the advantages of heterodyne mixing a subject signal with a coherent laser signal to increase detection capability within a narrow spectral range. For example, in a technical publication entitled "Heterodyne Detection of a Weak Light Beam", Journal of the Optical Society of America, Volume 56, No. 9, pp. 1200-1206 September 1966, L. Mandel teaches the use of laser heterodyne techniques to detect a weak, spectally narrow light beam from a distant source. The heterodyne principle was also used to detect the 10 $\mu m$ emission of $CO_2$ molecules in the atmosphere of the planet Venus; "Heterodyne Detection of $CO_2$ Emission Lines and Wind Velocities in the Atmosphere of Venus," A. L. Beltz, M. A. Johnson, R. A. McLaren and E. C. Sutton, the Astrophysical Journal 208, pp. 141-L 144 (Sept. 15, 1976).

The present invention advances the combination of a narrow band radiometer with a long range laser reflectometer in applications of remote temperature measurements by optical means. The concurrent measurement of the radiance from a distant hot surface within a narrow spectral band and the determination of the surface emissivity by measurement with the laser reflectometer within that same band is utilized to enhance the accuracy of radiometric temperature measurement.

In one embodiment of the invention an ultra narrow radiometer band widths is attained by the principle of heterodyne detection. In another embodiment a narrow radiometer band width is obtained with an optical filter.

Emissivity measuring devices as exemplified by U.S. Pat. Nos. 4,117,712 and 3,672,221 have demonstrated marginal practical utility and are nonapplicable for large distances between the subject surface and the measurement device and for hot surfaces with substantial radiative self emission. Also, similar to optical pyrometers, these emissivity measuring devices have severely limited application when the subject radiant source is in an optically absorbing medium.

SUMMARY OF THE INVENTION

The present invention teaches a unique radiometer capable of accurately determining the temperature of a radiant surface by independently measuring the surface's radiance and emissivity.

In one embodiment, applying heterodyne principles, the intercepted thermal radiation is superimposed with a local oscillator laser beam. The co-mixed optical signal is directed to a photodetector. The photoelectric output signal includes an rf signal which, selectively amplified and detected, is related to the incident thermal radiation. The technique provides substantially high detection sensitivity over a very narrow spectral bandwidth. The process of photomixing a single mode laser beam with the thermal radiation permits a high spatial as well as spectral resolution.

A direct measurement of emissivity is used to adjust the value obtained for the thermal radiation signal to substantially enhance the accuracy of the temperature measurement for a given subject surface.

In one embodiment of the invention, the laser signal is selectively chosen in relation to the anticipated ambient medium surrounding the subject radiant source, permitting accurate temperature measurement of radiant sources in environments such as hot $CO_2$ gas, heated water vapor or the like that otherwise limit pyrometer applications. This advantage is achieved without reducing the sensivity of the measuring device.

In another embodiment of the invention as applied to the measurement of temperatures relating to furnace operations, a GaAlAs laser is used to determine the surface emissivity while the independent and concurrent measurement of thermal radiance from said surface is made directly with a silicon photodetector through an optical prefilter. In the wavelength range in which the GaAlAs laser is operable (0.8 to 0.9 $\mu M$) there is no substantial absorptive interference with the radiation measurement by flue gas and an ultra-narrow band width is not required for a substantially accurate temperature determination.

DETAILED DESCRIPTION OF THE INVENTION

Figure 1:
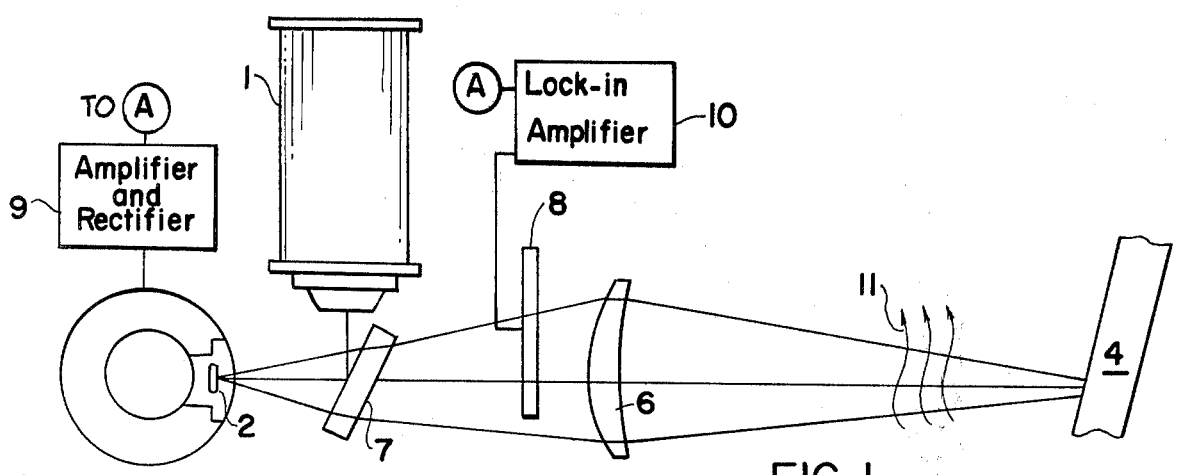
FIG. 1 is a schematic illustration of the components that constitute the laser radiometer.

The present invention teaches an improved laser pyrometer, capable of accurate remote temperature measurement of radiant sources. Illustrative thereof, FIG. 1 shows in schematic format, components constituting the laser radiometer aspect of one embodiment of the invention. The laser light source 1 provides a coherent, monochromatic light energy signal. The laser signal is the local oscillator in the heterodyne process in which coherent and thermal radiation are mixed. In one embodiment, the laser light signal will concurrently be used in the direct measurement of the subject surface emissivity. The selection of laser source 1 is based generally upon the intended application of the measurement and more particularly upon the ambient medium through which the temperature (and emissivity) are to be measured. Basic requirements are that the laser provide a stable output signal equaling or exceeding a certain prescribed powwer threshold such that the detector shot noise induced by the laser local oscillator exceeds the noise generated by electrical fluctuations in the resistive elements of the electrical detection circuit.

The principal emission wavelength of the laser source $\lambda$, is chosen so as not to coincide with any of the absorption lines of the ambient gas. The selection attempts to minimize the absorption at the wavelength of thermal radiation by the ambient gases of the laser. The selection of the laser in the present invention is of particular importance in applications involving temperature measurement through interfering media 11. For example, where the radiant source is viewed through an atmosphere which includes hot carbon dioxide, an isotopically modified $CO_2$ laser is used to avoid absorption (and emission) by the natural $CO_2$. In one such embodiment of the invention, laser light source 1 comprises a $^{13}CO^{16}_2$ laser having a primary output at a wavelength of about 10.80 μm. The characteristic narrow spectral bandwidth associated with the output of this laser at 10.80 μm falls between the absorption lines of natural $CO_2$ and hot water vapor. The term transmission window, as used herein, refers to spectral regions for which the interfering medium is substantially transparent, permitting light of that wavelength to pass through. The strength of the absorption (and emission) for such interfering gases changes with the temperature of the gas. Cold $CO_2$ and $H_2O$ have excellent infrared transmission windows below 1 μm, at 1.3 μm, at 2.1 to 2.3 μm, 3.6–4.0 μm and 8–13 μm which become less transparent at higher temperatures. Therefore according to the teaching of the present invention, the selection of laser source 1 is based upon the absorption (emission) characteristics of the particular interfering medium within a temperature range of anticipated operation. For the illustrated interfering gas 11 of $CO_2$ and $H_2O$ vapor, the transmission window at about 10.80 μm is selected to avoid the absorption (emission) lines of these two gases at a temperature ranging from about 500° C. to about 1500° C.

In a further preferred embodiment a reflective grating is employed as one of the laser reflectors to provide selection of one active line of the laser source 1.

A photodetector 2 is positioned to receive radiation from the subject source 4. A system of lenses is functionally operative to collect and direct intercepted thermal radiation to the photodetector. Collection lens, here illustrated at 6 may comprise any suitably arranged singular or array of optical lens(es) for selectively collecting a portion of the thermal radiation.

In a preferred embodiment, the collection lens, collectively illustrated at 6, includes optical prefilter means comprising at least one spectral bandpass filter. The optical pre-filter functions to discriminate the subject signal from unwanted optical signals of differing wavelength. The pre-filter has a spectral bandpass that transmits above the wavelength $\lambda$ of the laser output.

The system further includes beam combining means 7 which functions to co-mix the collected radiation with the laser signal. In a preferred embodiment, the beam combining means 7 comprises a $BaF_2$ prism, interposed between the photodetector 2 and the radiant source 4 and positioned to superimpose the laser signal with the thermal radiation signal. The superimposed signal is then directed to the photodetector 2. Selection of a particular photodetector is based upon the detector's ability to respond to the wavelength(s) of the laser light source, therefore also responding to the thermal radiation of the subject source at the wavelength of the laser. In a preferred embodiment, the quantum efficiency of the detector should exceed one percent. Of equal importance, the photodetector response must be sufficiently fast to respond to an electrical difference signal which results from a photomixing of the laser signal and selected portions of the thermal radiation signal. In a preferred embodiment photodetector 2 comprises a high speed HgCdTe photodetector operated in a cryogenic dewar at about liquid nitrogen temperature. This type of photodetector is responsive to radiation of wavelengths ranging from about 5 to 20 μm and exhibiting response times shorter than about 1 nanosecond. As detailed hereinafter, the superposition of the thermal radiation signal with the coherent monochromatic laser signal, produces an electrical broadband rf signal in the photodetector. The rf power is mathmetically related to the thermal radiance as detailed hereinafter.

In addition to the optical pre-filter described heretofore, (used to suppress unwanted portions of the thermal radiation) the system further includes discriminator means for distinguishing the subject rf signal from inherent system rf noise. Accordingly, the rf signal is amplified and rectified at 9 to yield a voltage signal which is proportional to the radiance of the remote source at the wavelength of the laser radiation. To distinguish the signal induced rf power from rf power associated with system noise, a mechanical chopper 8 periodically interrupts the incoming thermal radiation signal. The envelope of the rf signal after rectification is a square wave modulated voltage (associated with the subject signal). A conventional lock-in amplifier 10 is used to detect the envelope of that portion of the rf power that varies periodically in synchronism with the chopping frequency. The synchronous component of mined according to the relationship $E=1-R$. As described for the radiometer aspect of one of the embodiment of the present invention, the laser wavelength is selected to avoid or to minimize absorption by any interfering medium. For example, where the surface of radiant source 4 is surrounded by an ambient medium of heated water vapor and carbon dioxide, an isotopically modified $^{13}CO_2^{16}$ laser is used in one of the embodiments of this invention to provide the illuminating radiation. The principal laser output at 10.80 microns in that case passes through the normally interfering medium 11 without substantial absoption.

In another embodiment the reflectometer used a GaAlAs diode laser as illumination source. In the wavelength range in which the GaAlAs laser is operable (0.8 to 0.9 $\mu$m) there is no substantial absoptive interference by heated water vapor or carbon dioxyde.

Concerning the reflectivity i.e. emissivity, measurement, it should be recognized that diffusely reflected laser radiation exhibits a so-called speckle pattern that produces a spatial variation in the reflected intensity. However, the mean value of the reflected intensity is related to the surface emissivity. If the spatial sample used to measure the reflected intensity is too small, then the emissivity determination will be poor. A reduction in the measurement error to a satisfactory level can be accomplished by requiring that the detection system collect a large number of speckle lobes to obtain an average value for the reflected intensity with a small statistical deviation. This requirement puts restrictions on the apparatus; namely, that the optical receiver must resolve elements on the target surface that are much smaller than the total illuminated spot size. For instance, in order to measure target reflectivity with 1% precision, the illuminated spot must be at least 100 times larger in diameter than a resolution element. The geometric relationship of the receiver dimensions, its distance to the target, the wavelength and the receiver resolution are well known in the art. For example, assuming a practical size of $d=5$ cm for the receiver aperture and a target distance of $L=15$ meters, the diameter of the illuminated spot cannot be smaller than $100\times(\lambda/d)\times L=2.7$ cm ($\lambda=0.9$ $\mu$m) in order to achieve a 1% precision in the reflectivity measurement.

Under certain circumstances, the surface at point A may not reflect the laser light in a substantially diffuse manner, but may be specular or a combination of diffuse and specular. Therefore, in a preferred embodiment, beam directing means 39 is suitably arranged to direct the laser beam to illuminate a plurality of discrete points on surface of 4. The device is of advantage in obtaining the reflection data from several areas.

Although shown separately, the emissivity measurement apparatus is preferably integrated with the radiometry apparatus. The measured value for emissivity is used to either automatically or manually compensate the optically measured value of target radiance to provide the equivalent black body radiance yielding the temperature measurement accuracy characteristic of the present invention.

What is claimed is:

1. A laser heterodyne temperature measuring device for temperature measurement of a remote radiant source, said device comprises:
  a laser having a principal output at wavelength $\lambda$;
  means for intercepting an amount of thermal radiation emitted from said radiant source;
  means for superimposing said intercepted radiation with said laser signal;
  a photodetector positioned to receive said superimposed radiation and laser output, said photodetector responding thereto to provide a subject electrical beat signal, a value of power for said signal being a known function of thermal radiance of remote source;
  discriminator means being operative to distinguish a subject signal for unwanted noise signals;
  means for illuminating at least a portion of said radiant source with said laser signal, whereupon an amount of said illuminating laser signal is diffusely reflected from a surface region of said radiant source;
  means for detecting at least a portion of said diffusely reflected laser signal over a predetermined solid angle, said detecting means being responsive to provide a photoelectric signal which is a known function of emissivity for a surface region of said radiant source, said signal corresponding to a value of emissivity whereupon compensating said value of power for thermal radiance for said value of emissivity an accurate measurement of the temperature of the remote radiant source is provided, said detecting means collecting a plurality of speckle lobes of varying brightness of said reflected laser signal of sufficient number so as to obtain a spatial average over the intensity of said reflected laser signal.

2. The temperature measuring device of claim 1 wherein said discriminator means further comprises mechanical chopper means for periodically interrupting the radiation from reaching the photodetector whereby said periodically interrupted radiation, when superimposed with said laser signal, is synchronously detected to distinguish the subject signal (photoelectric current associated with the thermal radiation) from electrical noise.

3. The temperature measuring device of claim 1 wherein said discriminator means further comprises a segmented mirror which functions to alternatingly illuminate the photodetector from the remote radiant source and a reference source, said reference source constituting an infrared emitting device wherein the radiance of the reference source can be adjusted by electrical means and calibrated against a black body such that the radiance of the reference source is adjusted until the photodetector signal from said remote radiant source is about equal to the photodetector signal from said reference source whereupon the radiation temperature of the two sources are about equal.

4. The temperature measuring device of claim 1 wherein said means for intercepting an amount of thermal radiation includes optical pre-filter means having a spectral bandpass centered about the laser wavelength $\lambda$.

5. The temperature measuring device of claim 1 wherein said superimposing means comprises a BaF$_2$ prism.

6. The temperature measuring device of claim 1 wherein said discriminator means is further characterized as including rf rectifier means operable to provide a signal which is proportional to a time averaged value of the squared beat signal between the laser and the thermal radiation.

the ac signal, detected at 10, is averaged over a predetermined period, T, by conventional low pass filter means, not shown. The synchronous signal is proportional to the incident thermal radiation.

Figure 2:
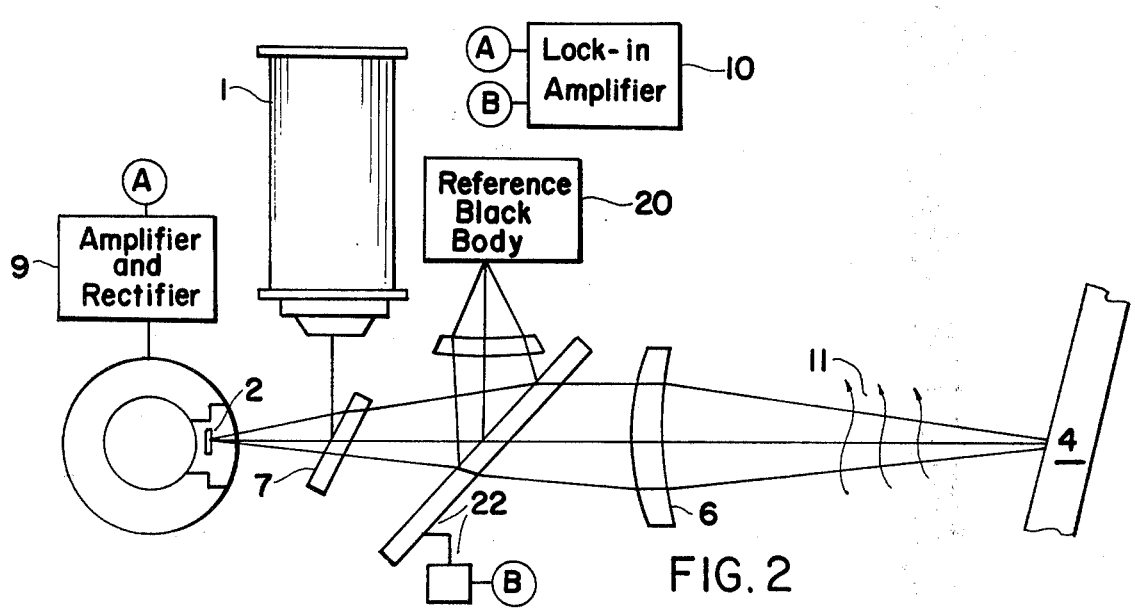
FIG. 2 illustrates an alternate embodiment of the laser radiometer.

Referring to FIG. 2, in an alternate embodiment a reference black body 20 is employed in conjunction with a rotating segmented mirror 22 to alternately illuminate the photodetector with the radiation of the reference source such as a black body, and the radiation from the subject source. In this manner, a differential signal between the synchronously detected black body and radiant source signals is proportional to the difference in the radiance of the subject source and the reference black body. The reference black body temperature is adjusted to null the differential synchronous signals. At this point, the radiation temperature of the target is equal to the regularly monitored physical temperature of the reference black body.

In a further embodiment a GaAlAs diode laser operates in the region of about 0.9 μm spectral range. The GaAlAs offers, in addition, the advantage of a solid state design compared with a vacuum tube design of $CO_2$ lasers.

In the particular case of hot flue gas 11 from a gas fired furnace, such gas has particularly low absorptivity (emissivity) over a spectral band with a width that can be defined by a conventional interference filter centered about 0.9 μm; it is therefore possible to relax the requirement for the ultra-narrow reciver bandwidth of heterodyne detection. The radiation temperature of the radiant surface about 0.9 μm may be measured by a direct detection method using a silicon photodetector with an optical prefilter. The prefilter serves to limit the optical bandwidth to a narrow range centered as the GaAlAs wavelength that is devoid of noticeably interfering absorption bands. The GaAlAs laser is used here only for the emissivity determination.

Figure 4:
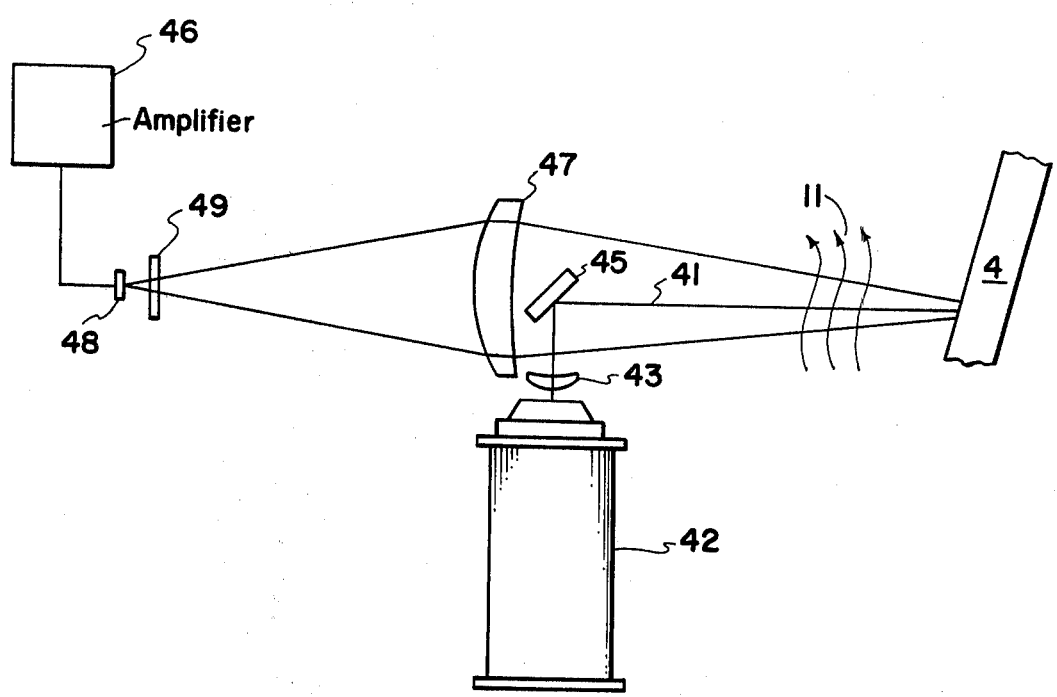
FIG. 4 illustrates an alternate embodiment of the radiometer.

In this case, referring to FIG. 4, the system includes a gallium-aluminum-arsenide diode laser 42. When the instrument is operated in the reflection mode the laser beam 41 is collimated by lens 43 and directed towards a target 4 with the help of beamfolding mirror 45. Part of the laser light, diffusely reflected off the target 4, is collected and focussed by lens 47. A silicon photodetector 48 is placed in the focal area to intercept the radiation thereby generating an electrical current which is amplified by electronic unit 46. This current is proportional to the intercepted radiation power and can be used to determine the emissivity of the target 4. An optical filter 49 is placed in front of the silicon photodetector to block all radiation but a narrow spectral portion centered about the laser wavelength. To distinguish the back scattered laser radiation from the radiant emission of the target 4 itself, a standard synchronous detection technique well known in the art is used. This is accomplished by operating the laser in repetitively pulsed fashion and detecting only that portion of the photo current which is synchronous with the lases pulses.

To operate the instrument in the radiometer mode, the laser is switched off. The photo electric signal is then proportional to the radiance of the target over the narrow wavelength band transmitted by filter 49.

PRINCIPLES OF OPERATION OF THE HETERODYNE RADIOMETER

Thermal radiation emitted by the subject source is, in part, intercepted by a collector lens and directed through a beam combining means where the thermal radiation signal is superimposed with the coherent laser signal which functions as a local oscillator. The mixed signal generates an electrical current in the photodetector which includes an ac-component that is proportional to the product of the laser electrical field and the elctrical field of a portion of the thermal radiation. Heterodyne mixing of the two waves is effective only if their phase fronts are substantially identical over the detector aperture. Since the laser of choice emits one spatial mode, the heterodyne detection process selects one spatial mode component from the received thermal radiation. Selective detection of one spatial radiation mode, coplanar with the laser beam, provides the substantially high spatial selectivity detection characteristic of the present invention while the limited electrical bandwidth of the photomixer provides high spectral resolution. The detector photocurrent I, produced by the mixed signal may be mathematically expressed as:

$$I \propto [E_L + E_S]^2 = E_L^2 + 2E_L E_S + E_S^2$$

where $E_L$, $E_S$ represent the electrical fields of the copolarized laser and thermal radiation, respectively. The term $2E_L E_S$ represents the heterodyne current of interest. This current is an ac-current, proportional to the beat signal between the laser and one spatial component of the thermal radiation. Conventional rf rectifier and amplifier means is used to provide a voltage signal which is proportional to a time averaged value of the square of the ac current. This voltage is correspondingly proportional to the radiance of the subject source at the wavelength of the local oscillator laser.

For shot-noise-limited operation (sufficient local oscillator power) the accuracy of the radiometer is expressed by the minimum theoretical temperature uncertainty ΔT, according to the proportionality:

$$\Delta T \alpha \frac{1}{\sqrt{Bt}}$$

where B is the bandwidth of the photodetector, and t is the postdetection integration time.

Principle of Operation of the Laser Reflectometer (or emissivity meter)

Figure 3:
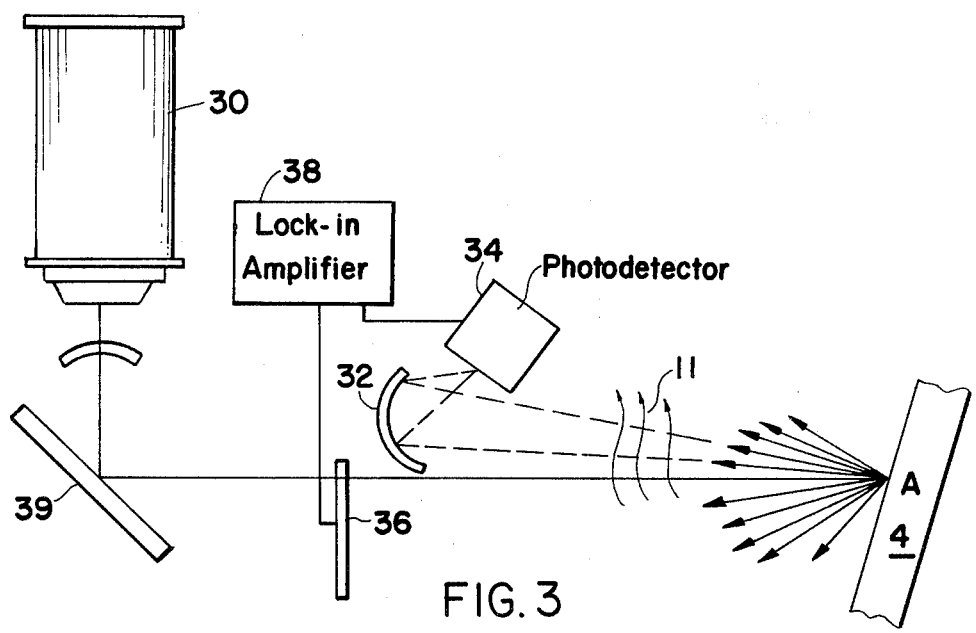
FIG. 3 is a schematic illustration of the components that constitute the reflectometer (emissivity meter).

Referring to FIG. 3, there is shown, in schematic format, the components constituting the emissivity measuring apparatus of the present invention. A laser source 30 may comprise the same laser used in the radiometry measurement of temperature shown in FIGS. 1 and 2 as laser source 1. The laser beam is directed to illuminate the subject surface 4 which diffusely scatters the incident laser radiation as illustrated by the plurality of arrows emanating from area A on the surface of 4. A portion of the diffusely reflected light is intercepted by collector means 32 which intercepts the reflected light over a known solid angle. The intercepted light is directed to a photodetector 34 which generates a photoelectric signal proportional to the intercepted light signal. In a preferred embodiment, the laser light signal is chopped by mechanical means 36, providing an alternating signal. A lock-in amplifier 38, may then be used to detect substantially only those light signals originating with source 30 and reflected from the surface at A.

The refectivity, R, of the surface is determined by measuring the diffusely reflected laser radiation over a known solid angle. The emissivity, E, is then deter- 7. The temperature measuring device of claim 1 wherein said photodetector comprises a HgCdTe photodetector operated at cryogenic temperatures.

8. The temperature measuring device of claim 1 wherein said laser signal is generated by a CO₂ laser.

9. A combined reflectometer and radiometer for accurate temperature measurement of a remote radiant source, comprising;
    a source of a laser light signal;
    lens means for intercepting an amount of thermal radiation emitted by said radiant source;
    means for alternately superimposing said thermal radiation with said laser signal and directing said signal to illuminate at least a predetermined portion of said radiant source;
    photodetector means positioned to receive said superimposed thermal radiation and laser signal said photodetector being responsive to produce a subject beat signal which is proportional to a value of thermal radiance for said remote source;
    discriminator means being operative to distinguish said subject signal from unwanted noise signals;
    means for detecting at least a portion of diffusely reflected laser light signal over a predetermined solid angle, said detecting means being responsive to provide a photoelectric signal which is a known function of emissivity for said illuminated surface whereupon compensating said value for thermal radiance for said emissivity an accurate measurement of the temperature of the remote radiant source is provided, said detecting means collecting a plurality of speckle lobes of varying brightness of said reflected laser signal of sufficient number so as to obtain a spatial average over the intensity of said reflected laser signal.

10. A combined reflectometer and radiometer for accurately measuring a temperature for a remote radiant source through an interfering medium comprising;
    a laser source having an output signal of about wavelength λ; said interfering medium being substantially transparent to light energy of wavelength λ;
    lens means for intercepting an amount of thermal energy radiated by said remote source;
    means for optically combining said thermal radiation with said laser signal;
    photodetector means, positioned to receive said comixed signal said photodetector being responsive to said signal to produce a beat signal which is proportional to a value for the thermal radiance of said remote source;
    means for illuminating at least a portion of a surface region of said remote source with a predetermined laser signal having a wavelength equal to about λ, said signal being substantially diffusely reflected from said surface;
    means for detecting a portion of said reflected signal over a predetermined solid angle said detecting means including a photodetector being responsive to said detected signal to provide an electrical signal which is a known function of the emissivity for said surface whereupon adjusting said value for the thermal radiance by said emissivity obtained for the surface of the radiant source, an accurate temperature measurement of the radiant source is provided, said detecting means collecting a plurality of speckle lobes of varying brightness of said reflected laser signal of sufficient number so as to obtain a spatial average over the intensity of said reflected laser signal.

11. The combined reflectometer and radiometer of claim 10 wherein said interfering medium is further defined as at least one gas situated in at least an optical path between said lens means and said radiant source, said at least one gas having a characteristic absorption and emission spectrum which is substantially non-absorbing and non-emitting at about wavelength at about a temperature T, said temperature being within an order of magnitude of the temperature of said radiant source.

12. The combined reflectometer and radiometer of claim 11 wherein said interfering gas comprises a mixture of heated CO₂ and heated water vapor and said laser source is an isotopically modified $^{13}CO_2^{16}$ laser having a principal output signal at equal to about 10.80 microns, said gas mixture being substantially transparent to said laser signal.

13. A method for accurately measuring a temperature of a remote radiant source, said method comprising;
    intercepting an amount of thermal radiation emitted from said source;
    superimposing said intercepted radiation with a laser signal;
    detecting said superimposed signals with a photodetector to provide a subject electrical beat signal, a value of power for said signal being a known function of the thermal radiance of said source;
    discriminating said subject signal from unwanted noise signals;
    illuminating a surface region of said remote source with a laser signal, said signal being diffusely refelcted from said surface region;
    detecting a plurality of speckle lobes of varying brightness of said reflected signal over a predetermined solid angle of sufficient number so as to obtain a spatial average over the intensity of said reflected signal, said reflected signal providing a signal which is a known function of emissivity for said surface region;
    compensating said value for thermal radiance for said emissivity to provide an accurate measurement of the temperature of the remote radiant source.

14. A laser temperature measuring device for temperature measurement of a remote radiant source, said device comprising;
    a. means for intercepting an amount of thermal radiation emitted from said radiant source;
    b. a photodetector positioned to receive said radiation, said photodetector responding thereto to provide a subject electrical signal, a value of electrical current for said signal being a known function of thermal radiance of the remote source, thereby providing a value for said thermal radiation;
    c. discriminator means being operative to distinguish a subject signal from unwanted noise signals;
    d. a laser having a principal output at wavelength λ;
    e. means for illuminating at least a portion of said radiant source with said laser signal, whereupon an amount of said illuminating laser signal is diffusely reflected from a surface region of said radiant source;
    f. means for detecting at least a portion of said diffusely reflected laser signal over a predetermined solid angle, said detecting means being responsive to provide a phtotelectric signal which is a determinable function of the emissivity for a surface region of said radiant source whereupon compensating said value of thermal radiance for said emissivity an accurate measurement of the temperature of the remote radiant source is provided, said detecting means collecting a plurality of speckle lobes of varying brightness of said reflected laser signal of sufficient number so as to obtain a spatial average over the intensity of said reflected laser signal.

15. The temperature measuring device of claim 14 wherein said means for intercepting an amount of thermal radiation includes optical pre-filter means having a spectral bandpass centered about the laser wavelength $\lambda$.

16. The temperature measuring device of claim 14 wherein said laser is a GaAlAs laser.

* * * * *